United States Patent [19]

Swenson

[11] 4,118,915
[45] Oct. 10, 1978

[54] APPARATUS FOR AUTOMATICALLY APPLYING TUBING AROUND AN OBJECT

[75] Inventor: Harold R. Swenson, Walnut Creek, Calif.

[73] Assignee: Systematic Packaging, Inc., Pleasant Hill, Calif.

[21] Appl. No.: 771,619

[22] Filed: Feb. 24, 1977

[51] Int. Cl.² .................... B29D 3/00; B65B 7/28
[52] U.S. Cl. .................... 53/291; 29/33 E; 29/564.6; 53/296
[58] Field of Search ............ 29/33 E, 33.5, 33.52, 29/564.6; 53/184, 184 S, 291–296, 30 S; 93/82

[56] References Cited
U.S. PATENT DOCUMENTS

| | | | |
|---|---|---|---|
| 2,660,353 | 11/1953 | Gampp | 53/292 |
| 2,765,607 | 10/1956 | Aguilar | 53/291 |
| 2,846,835 | 8/1958 | Aguilar | 53/291 |
| 2,860,468 | 11/1958 | Aguilar | 53/291 |
| 2,973,698 | 3/1961 | Orlando | 93/82 X |
| 3,924,387 | 12/1975 | Konstantin | 53/291 |
| 3,959,065 | 5/1976 | Ashcroft | 53/184 S X |
| 3,974,628 | 8/1976 | Konstantin | 53/291 |
| 4,016,704 | 4/1977 | Fujio | 53/296 |

*Primary Examiner*—Donald G. Kelly
*Attorney, Agent, or Firm*—Phillips, Moore, Weissenberger, Lempio & Majestic

[57] ABSTRACT

A machine for applying tubing over any desired area of an object, including a supply of flat, flexible tubing having sharp creases on either side of the tubing, apparatus for reducing slightly the creases to open partially the tubing, a knife for cutting the partially opened tubing to provide a predetermined length of cut tubing, a mechanism to hold externally at the reduced creases the tubing which is being cut and to shape the cut tubing into any desired shape corresponding to the shape of the object which is to receive the cut tubing, and apparatus for moving the cut and shaped tubing around the object. In one embodiment, the holding and shaping mechanism is moved together with the cut tubing over the object, the mechanism then releasing the cut tubing around the object and returning to an initial position to hold and shape additional cut tubing. In another embodiment, the mechanism is held away from the object, but the cut tubing is caused to slide out of the mechanism and over the object. Two embodiments for feeding the flexible tubing in relation to the cutting knife are also disclosed, one embodiment including a shaft encoder-decoder and photoscanner technique which is used with tubing having printed matter, and the other embodiment including only the shaft encoder-decoder technique which is used with plain tubing.

37 Claims, 14 Drawing Figures

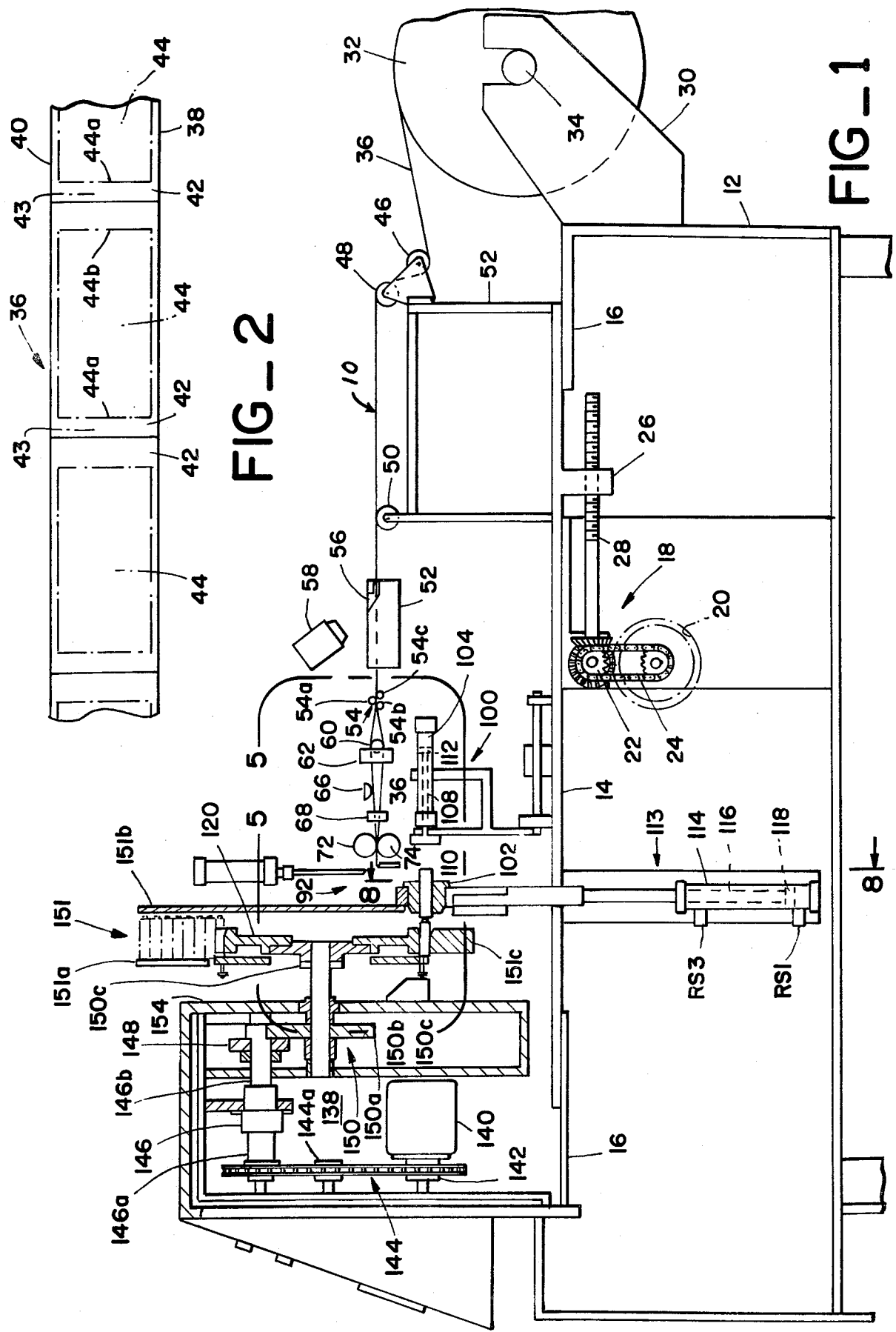

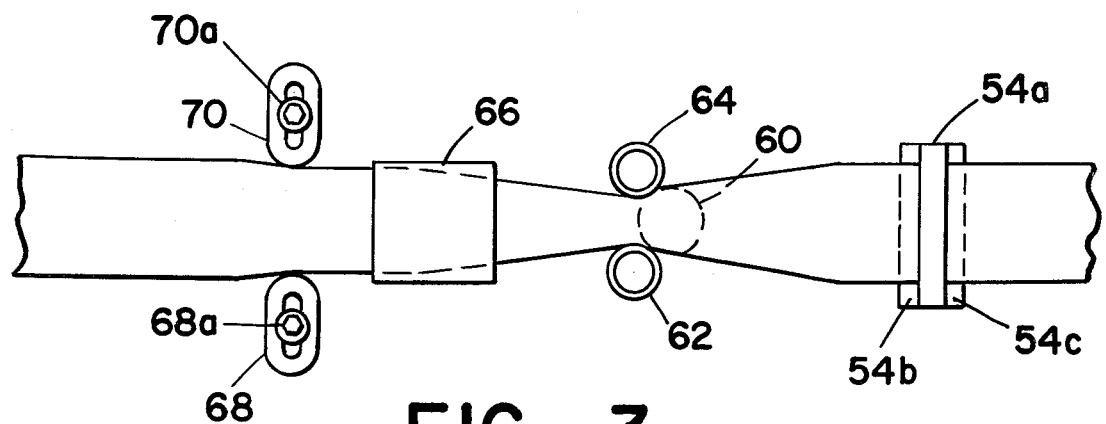
FIG_3
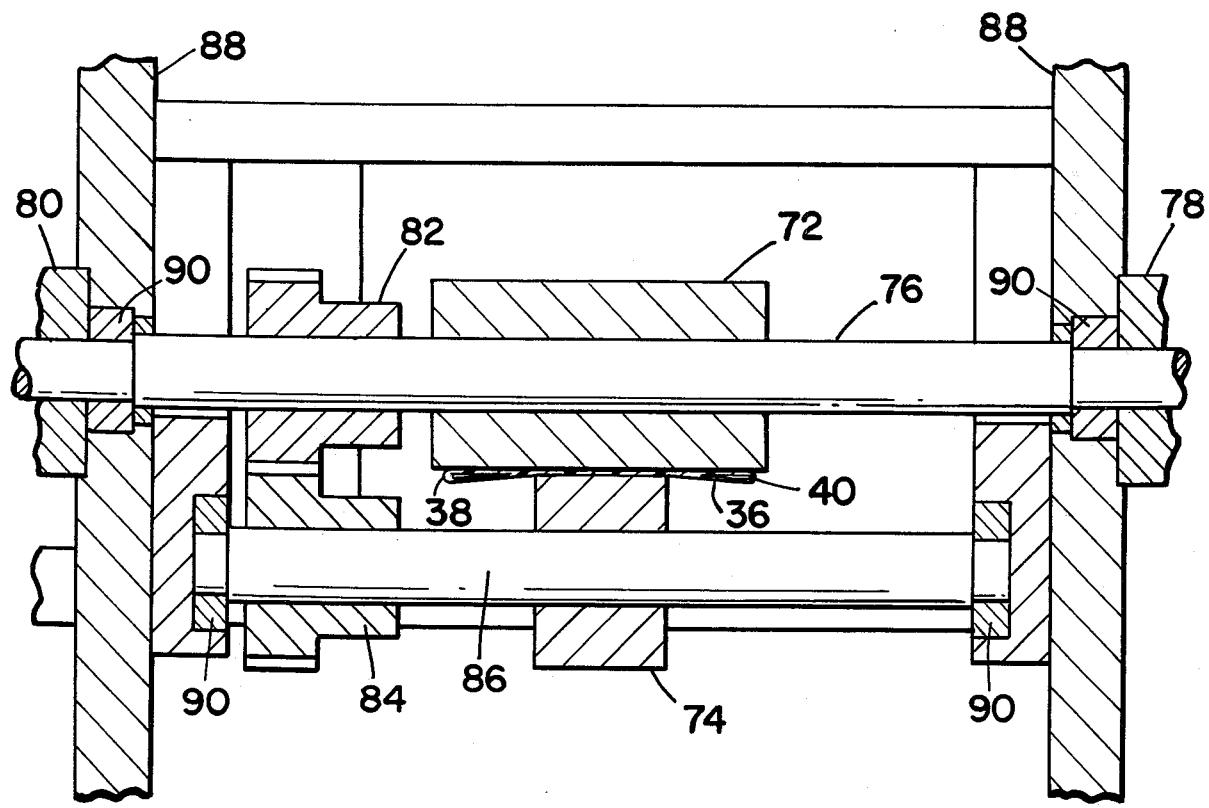
FIG_4

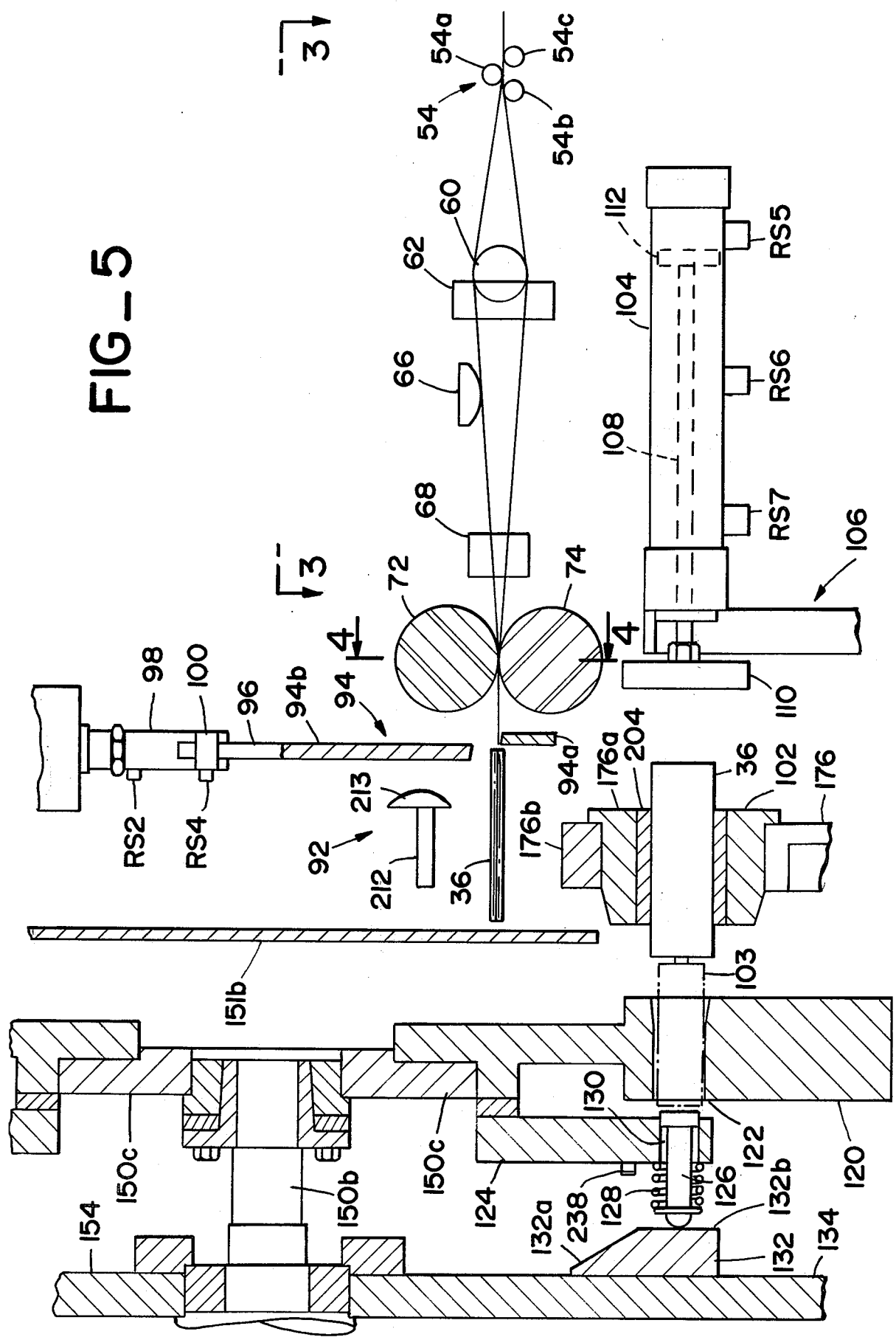
FIG_5

FIG_6
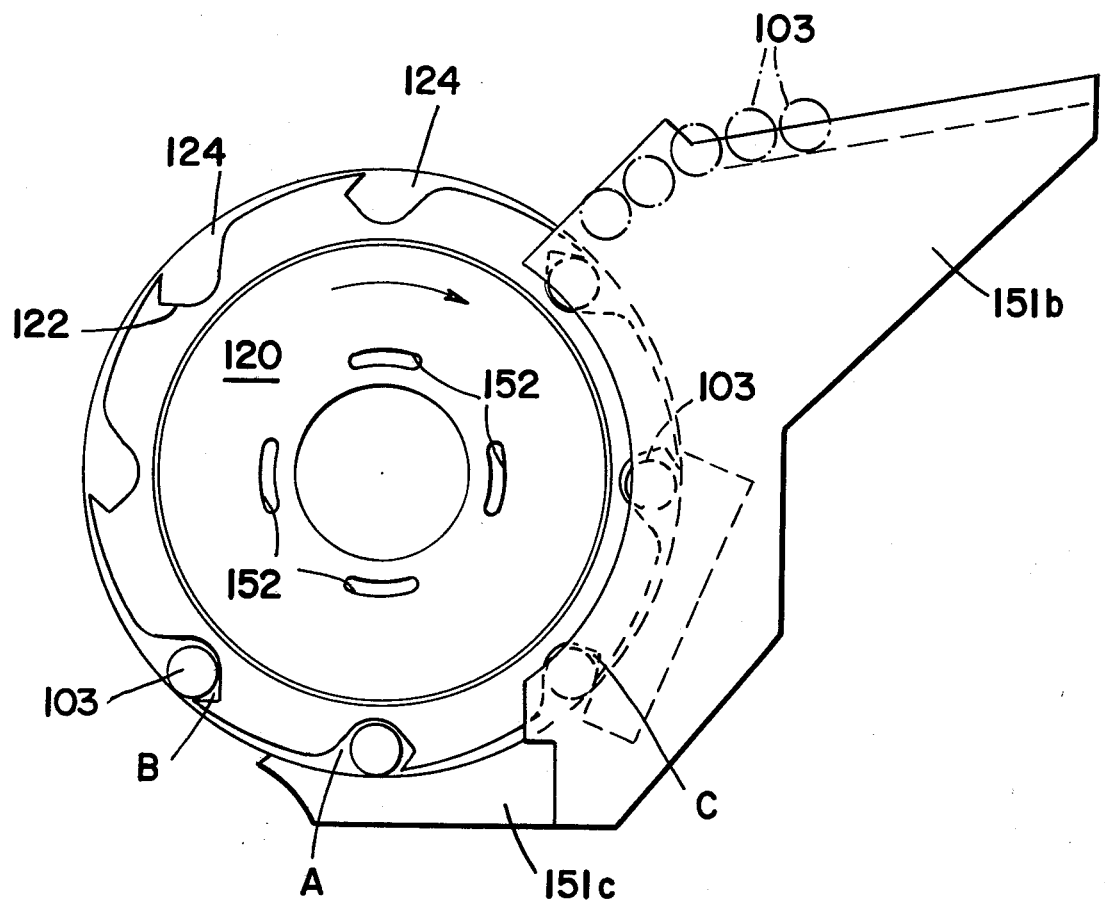
FIG_7
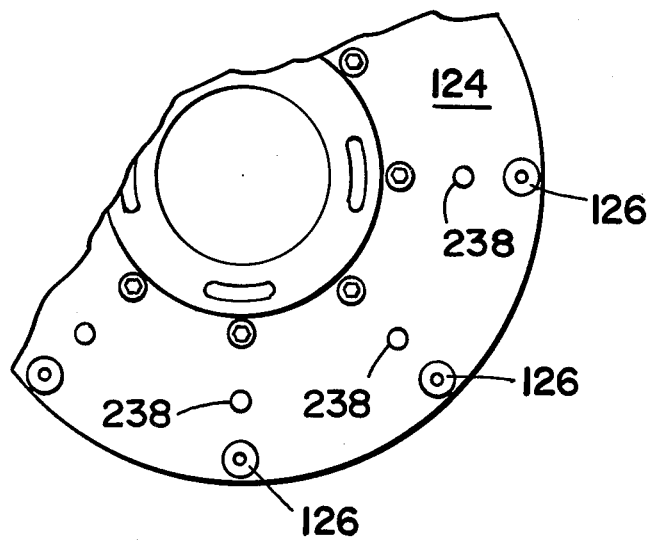

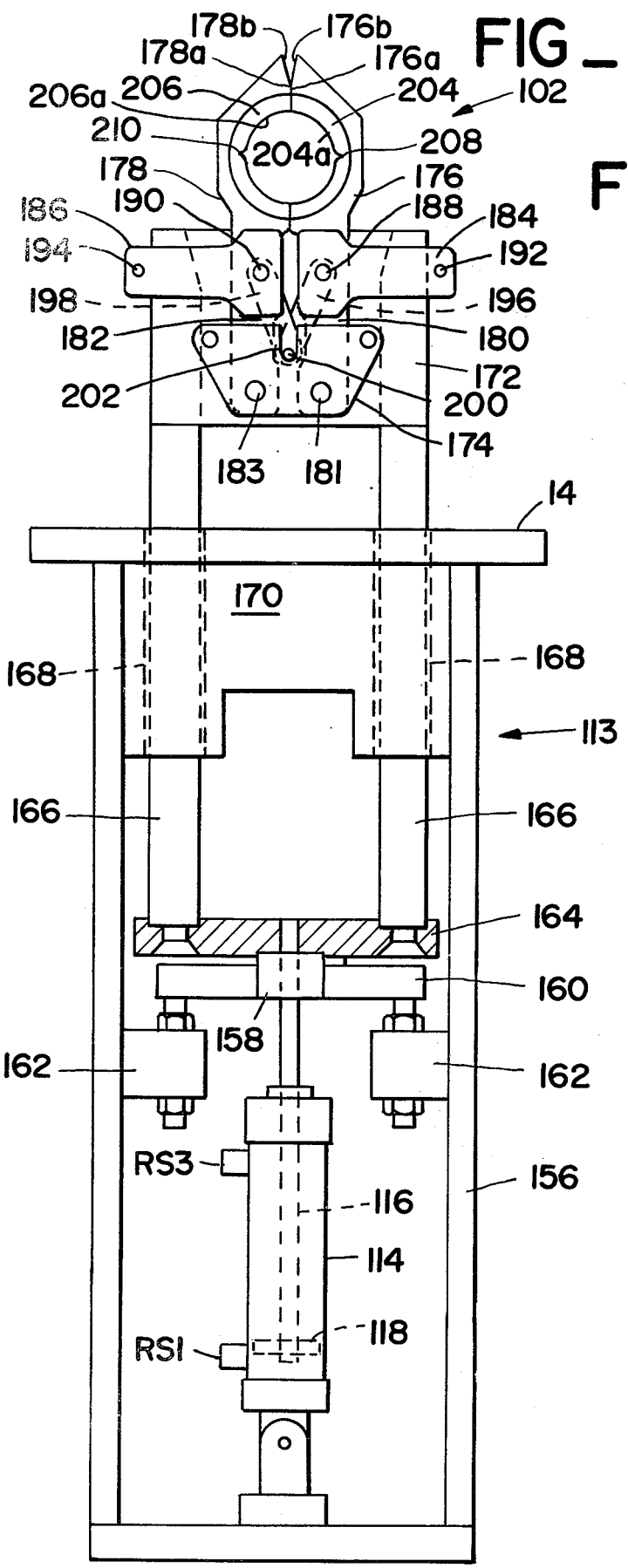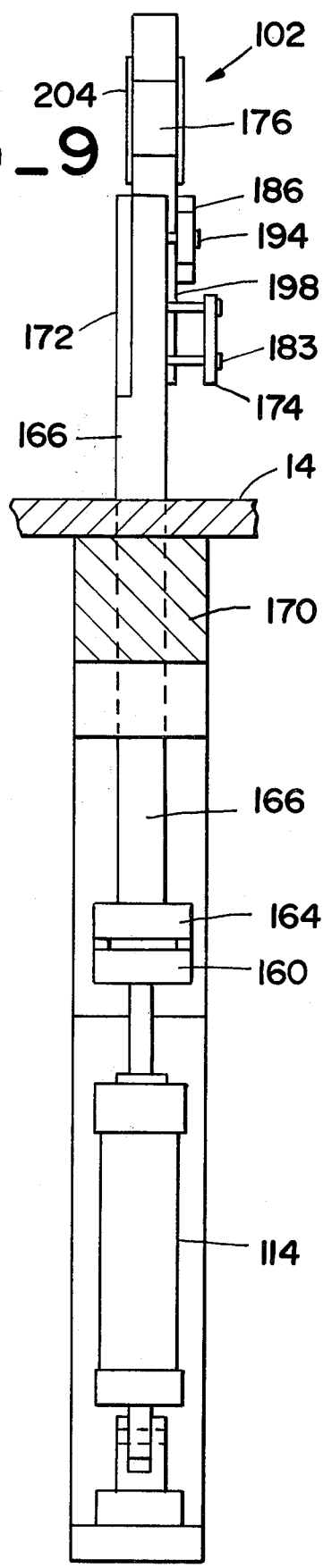
FIG_8
FIG_9

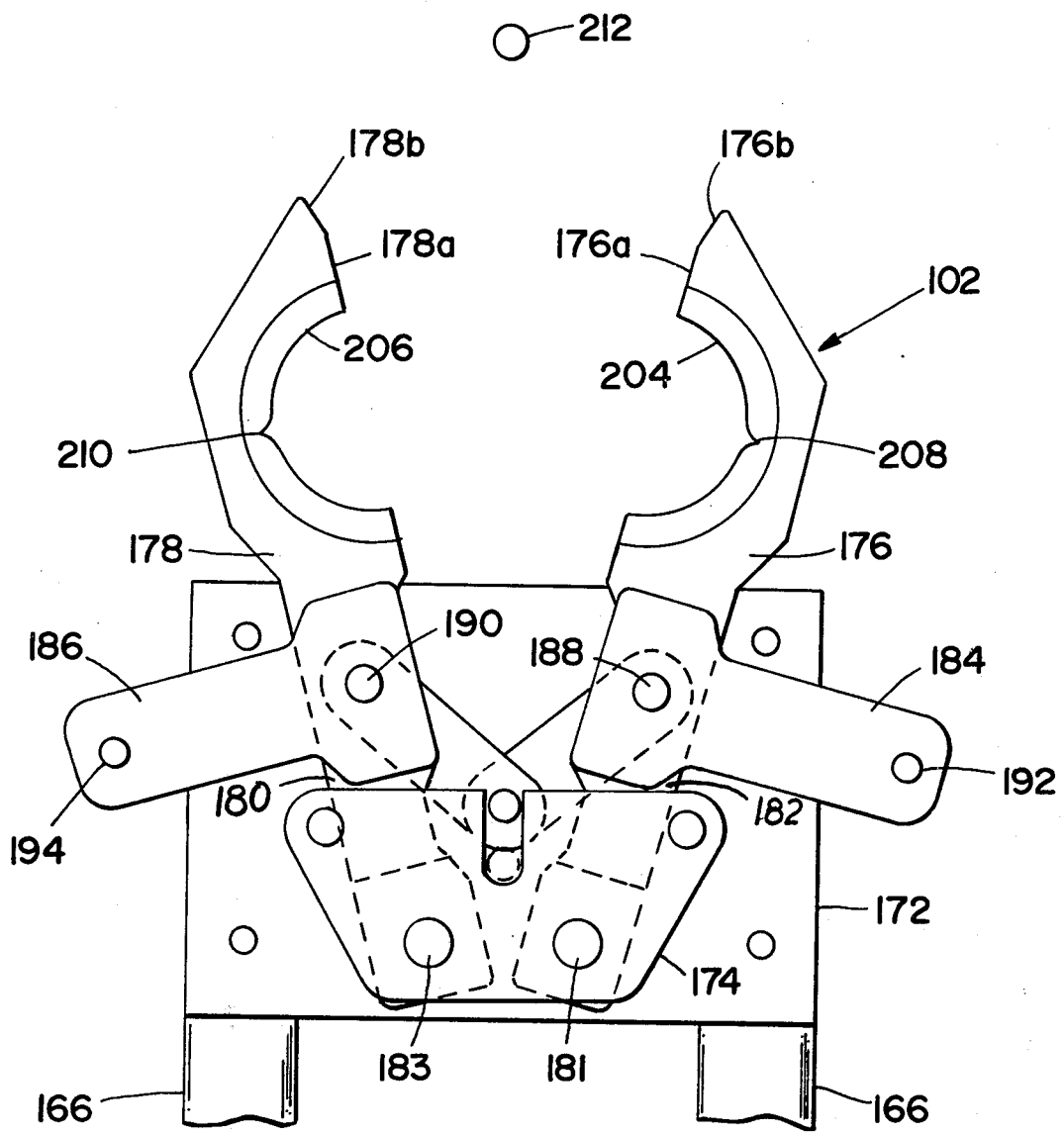
FIG_10
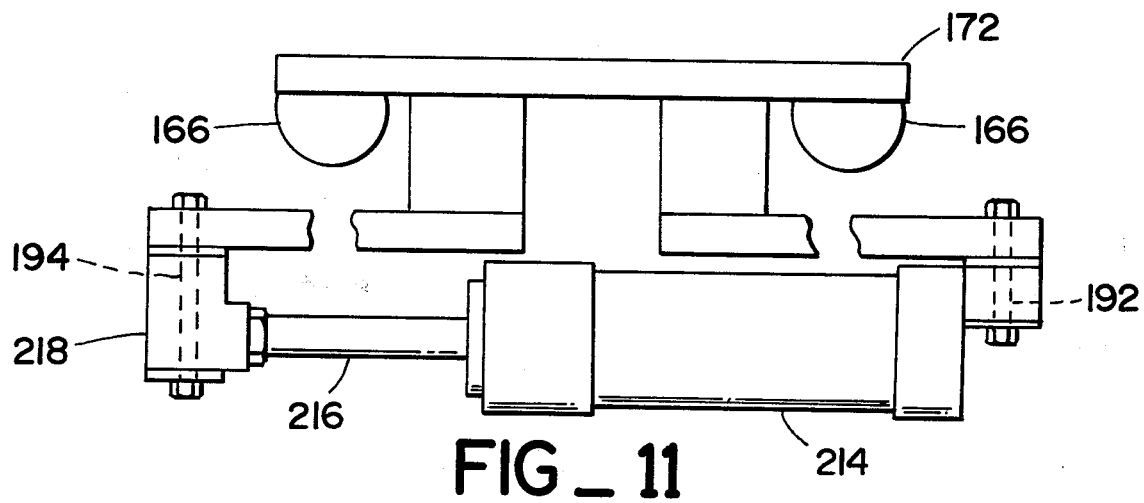
FIG_11

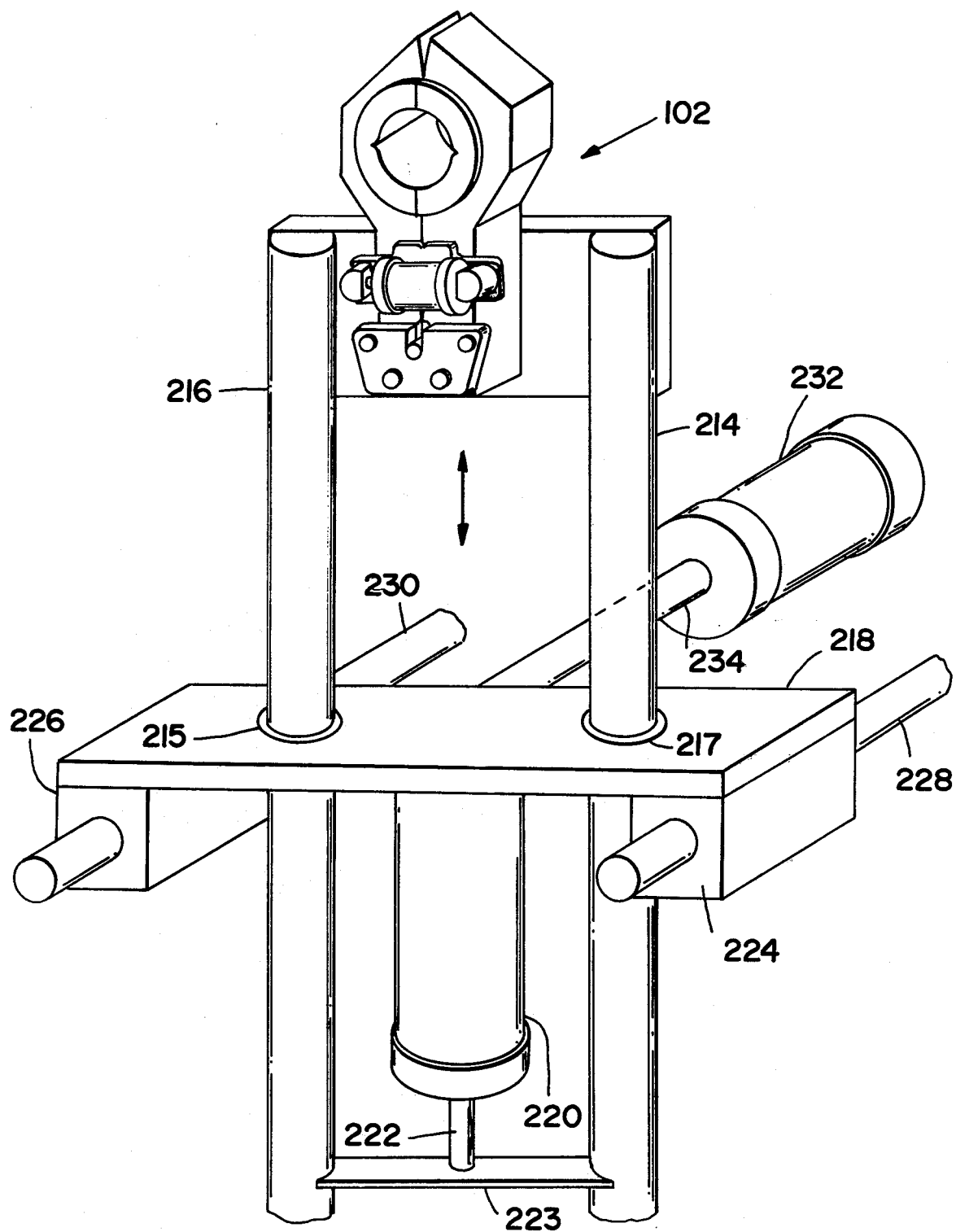
FIG_12

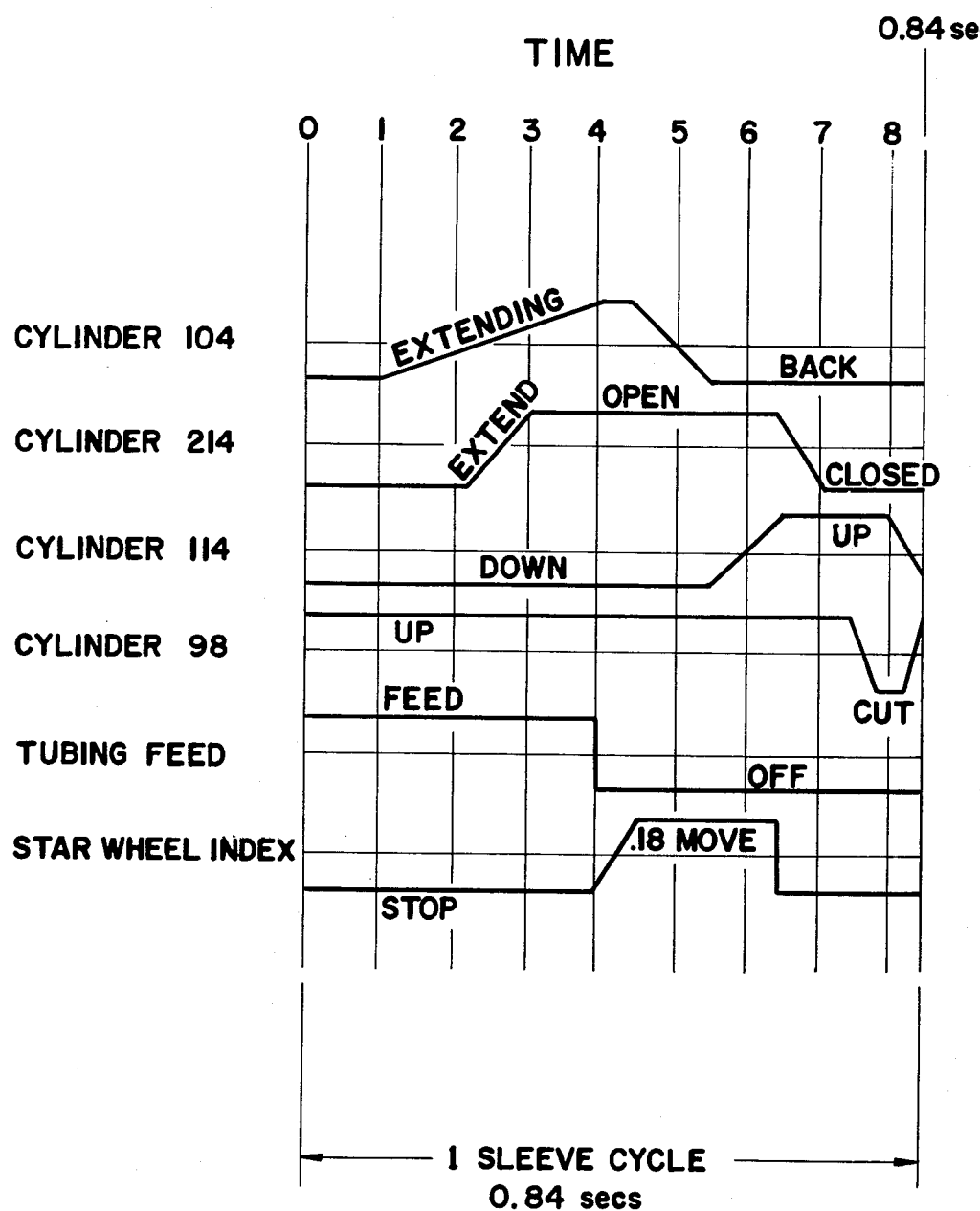
FIG_13

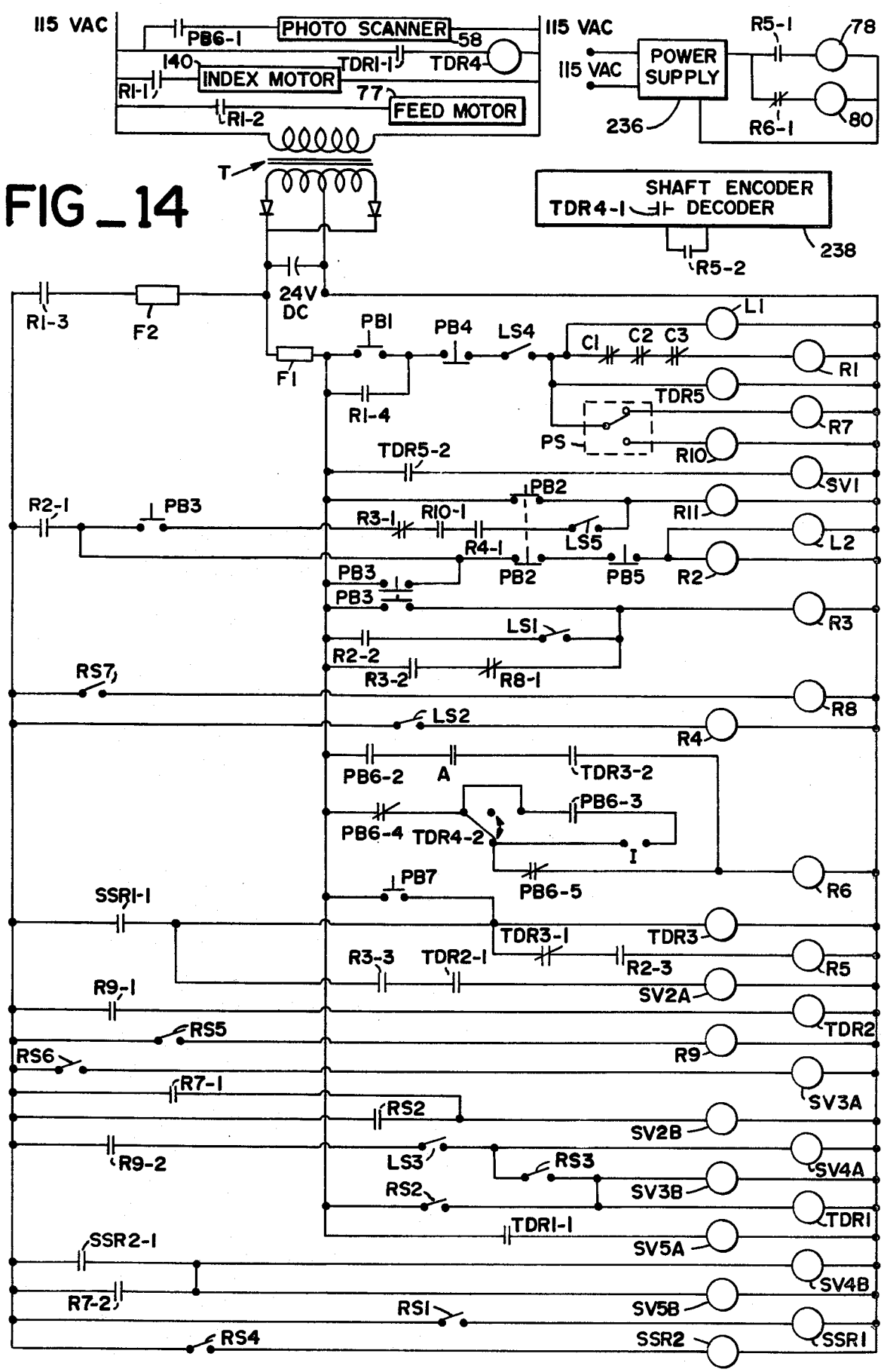
FIG_14

APPARATUS FOR AUTOMATICALLY APPLYING TUBING AROUND AN OBJECT

BACKGROUND OF THE INVENTION

This invention relates to an apparatus for feeding material around an object and, more particularly, to apparatus for shaping flat flexible tubing material to one of a plurality of shapes and placing the shaped material around any desired area of the object.

Banding machines which automatically place a bond of material around an object such as a bottle have been in commercial use for many years. These machines function to receive a continuous supply of flat, flexible tubing which is shaped by the machine and then placed around the object to become, for example, a label on a bottle or a seal which fits over the neck and cap of the bottle. A continuous strip of flat tubing is fed into the machine where it is cut into a specified length and shaped to conform it to the part of the bottle over which it will extend. The bottle with the cut tubing over it is then transported to a heat shrink tunnel which heat shrinks the tubing in a tight configuration around the bottle. The sequence of cutting and shaping varies depending on the particular machine being used.

In one type of banding machine, the flat tubing is opened around a circular mandrel which shapes the tubing. The tubing is cut to a desired length while on the mandrel and then pushed over a neck of a bottle by the remaining uncut tubing on the mandrel. In another type of banding machine, the continuous tubing is compressed at its sharp side creases to form additional less severe creases at about 90° from the original side creases. The shaped tubing is cut to a desired length and then allowed to fly in free flight into a circular funnel where it descends partially by gravity and is held in the funnel by the contact of the four creases with the funnel walls. The tubing is then pushed out the lower end of the funnel onto the neck of a bottle.

A significant disadvantage with both types of machines is that they are limited to applying banding to one basic shape bottle, i.e., a circular bottle. In one instance, as noted above, only circular mandrels are employed to shape the tubing into a generally circular configuration. In the other instance, because of the use of a circular funnel, the tubing is formed generally into a circular configuration so that it can be held in the funnel at the four creases until pushed over the bottle. These two types of machines, therefore, cannot shape the flat tubing into other shapes such as an oval or square shape for placement over similar shaped bottles.

An equally significant disadvantage with these prior machines is that they cannot adequately move the cut tubing over any one specific area of the bottle, such as only over the center or lower end of the bottle. The reason for this is that both types of machines require the cut tubing to be pushed from one end over the bottle. When the flexible cut tubing moves off the mandrel or funnel and partially over the bottle, continued pushing towards the bottle center would cause deformation of the tubing, such as unwanted creasing, in the area of such one end.

Furthermore, all banding machines are required to cut a specified length of tubing, which length is dependent on the area of the bottle desired to be covered. Consequently, it is necessary that the machines have a mechanism to register the tubing in relation to the cutting knife. At least one of the mandrel type banding machines uses fingers which engage perforations located in predetermined areas of the tubing to move the material a preset distance with the fingers engaged in the perforations. An obvious disadvantage of this registration technique is that the manufacturer of the tubing is required to add perforations to the tubing in order to use the banding machine. On the other hand, the machine having the funnel includes a registration technique in which a pneumatic cylinder forces a pusher down onto the surface of the flat tubing and then pushes the tubing a preset distance; the pusher is then withdrawn from the surface and retracted to its initial position where it again contacts the surface of the tubing and pushes it the preset distance. A disadvantage of this technique is that the tubing can be damaged by forcing the pusher onto the surface.

The present invention has the advantage of being able precisely to locate tubing around any desired area of an object without deforming the tubing once it has been shaped. The present invention also has the advantage of being able to conform the flat tubing to any desired shape so that it can be placed around a corresponding shaped object. Another important advantage of the present invention is that it can register the tubing in relation to a cutting knife to cut a desired length of tubing without requiring the tubing manufacturer to place additional markings or perforations on the tubing than otherwise would be placed thereon; also, the inventive registration technique does not require handling the tubing in a way that might cause damage to it.

SUMMARY OF THE INVENTION

The above and other advantages of the present invention are obtained by maintaining positive external control of the cut tubing from the time it is being cut to the time it is placed at least substantially around a desired area of the object. The invention includes a machine having a means for supplying continuous tubing, a means for cutting the continuous tubing into predetermined lengths, a means for holding externally a tubing of predetermined length, and a means for moving the cut tubing around an object, in which the holding means holds the tubing from the time the tubing is being cut to the time the cut tubing is moved at least substantially around the object. In addition, the holding means shapes the cut tubing to conform substantially such tubing to the shape of the object.

In one embodiment, the holding means is moved with the shaped and cut tubing over the object to any desired area of the object, and then such means releases the tubing and is returned to an initial position, leaving the tubing around the object. In another embodiment, the holding means holds the cut and shaped tubing away from the object. Then, while the holding action continues, the tubing is pushed from one end to slide out of the holding means to a desired area around the object. In this other embodiment, the holding means does not release completely the tubing until the latter is substantially over the object.

A sensing means, which does not physically contact the tubing, is employed to stop the feeding of the tubing when a predetermined amount of tubing is registered in relation to the cutting means. In one embodiment, if the tubing has printed matter such as labeling normally placed on it by the tubing manufacturer, the sensing means includes a photoscanner which is energized at predetermined times during feeding of the tubing to scan for a certain part of the printed matter to stop such feeding. In another embodiment, if the tubing is plain, a shaft encoder-decoder, coupled to a shaft of a drive roller for feeding the tubing to the cutting means, senses shaft rotation. After a predetermined shaft rotation, at which time the tubing is properly registered in relation to the cutting means, the encoder-decoder causes the feeding operation to cease. For reasons which will become apparent, in the one embodiment of the sensing means, the activation of the photoscanner is controlled by the shaft encoder-decoder.

BRIEF DESCRIPTION OF THE DRAWINGS

FIG. 1 is a side elevation of one embodiment of the overall apparatus of the present invention.

FIG. 2 is a fragmentary plan view of the tubing processed by the apparatus of FIG. 1.

FIG. 3 is a plan view taken along lines 3—3 of FIG. 5.

FIG. 4 is a sectional view taken along lines 4—4 of FIG. 5.

FIG. 5 is an enlarged sectional view of the area encircled in FIG. 1.

FIG. 6 is a front elevation of the star wheel of FIG. 1.

FIG. 7 is a fragmentary view of the reverse side of the star wheel of FIG. 6.

FIG. 8 is an elevational view taken along lines 8—8 of FIG. 1 of a tube holding and shaping mechanism and transporter for the mechanism.

FIG. 9 is an end elevational view of FIG. 8.

FIG. 10 is an enlarged view showing the tube holding and shaping mechanism in an open position.

FIG. 11 is a fragmentary plan elevation of the holding and shaping mechanism of FIG. 10.

FIG. 12 is a perspective view of an alternative embodiment of a transporter for the holding and shaping mechanism.

FIG. 13 is a timing diagram helpful in describing the operation of the apparatus of FIG. 1.

FIG. 14 is a schematic wiring diagram of a circuit for operating the apparatus of FIG. 1 in accordance with the timing diagram of FIG. 13.

DETAILED DESCRIPTION OF THE DRAWINGS

The machine 10, shown in FIG. 1, includes a main frame 12 having a movable support table 14 which is slidable in relation to a fixed support table 16. The frame 12 supports a mechanism 18 for sliding the table 14, which mechanism 18 includes a rotatable hand wheel 20 that rotates miter gears 22 via a roller chain 24. Table 14 has depending therefrom a threaded block 26 which receives a jack screw 28 that is rotatable by the gears 22. Upon rotation of the hand wheel 20, screw 28 will rotate to move block 26 axially along the screw and thereby slide table 14 in relation to table 16. As will become apparent, this table movement enables objects of varying size to be placed in proper position for receiving tubing to be cut by machine 10.

Frame 12 supports at one end a bracket 30 which holds a feed reel 32 that is rotatable on shaft 34. Feed reel 32 stores a roll of flexible tubing 36 in flattened form, which tubing is to be cut, shaped and placed around an object. As indicated in FIG. 2, the tubing 36 is continuous as it is supplied by reel 32 and has sharp creases or memory 38 and 40 on either side of the tubing. The tubing 36, as it is provided by the tubing manufacturer, includes a plurality of labels 42 each having background area of one color 43 and printed matter 44 of another color. Alternatively, the tubing 36 can be plain, i.e., one solid color with no printed matter. As will be described, the machine 10 has different sensing techniques for enabling predetermined lengths of tubing 36 to be cut, depending on whether the tubing has printed matter or is plain.

The tubing 36 is fed from the supply reel 32 through two rollers 46 and 48 and then over a support roller 50, all of which are supported on a frame 52. The tubing 36, as it is supplied from reel 32, is somewhat coiled, particularly since usually it has been stored on the reel 32 for a long time. Rollers 46 and 48 function to straighten the tubing 36, thereby removing substantially all of the coil.

A guide 52 receives the tubing 36 from support roller 50 and feeds the tubing through guide pins 54. Guide 52 has a window 56 through which light from a photoscanner 58 impinges on the tubing 36 for sensing the printed matter 44 to cut a predetermined length of tubing. While the guide 52 and photoscanner 58 are shown as elements of the machine 10, it is to be noted that they would not be required if plain tubing 36 is being supplied. One example of a suitable photoscanner is Model MCS-628 Color Mark Scanner made by Warner Electric Brake and Clutch Company, Beloit, Wis.

As shown in FIGS. 1, 3 and 5 guide pins 54 include an upper pin 54a and two lower pins 54b and 54c. Tubing 36 is fed between upper pin 54a and the two lower pins 54b and 54c, which maintain the tubing flat at this point in its travel and which prevent the tubing from twisting about its center line, as the tubing will have a tendency to do since it is flexible. Since the tubing 36 is flat just as it leaves guide pins 54 and has the sharp creases or memory 38 and 40 which maintain the tubing in its flattened condition, it is necessary to reduce this sharpness or memory by a small amount. Otherwise, the tubing 36 will remain substantially flat and could not be shaped into a suitable configuration in the manner to be described. Consequently, a steel ball 60 is placed inside the tubing 36 and prevented from travelling with the tubing by rollers 62 and 64, as shown in FIG. 1 and more clearly in FIGS. 3 and 5.

Ball 60 opens the tubing 36 a small degree and then this opened tubing is passed between rollers 62 and 64 which push on the sharp creases 38 and 40, respectively, to reduce the memory by a small amount. The effect of this crease reduction is to enable the tubing 36 to open a small amount as the tubing passes therethrough, as shown in FIGS. 1 and 5. At this point in the process, the tubing 36 would have a tendency to move upwards out of contact with rollers 62 and 64. Therefore, a block 66 constrains the upward movement of the tubing 36 so as to maintain it between the rollers 62 and 64. The tubing 36 is then fed between two guide bars 68 and 70, which are laterally adjustable by loosening bolts 68a and 70a and sliding the bars, to guide the tubing between two drive rollers 72 and 74 which move the tubing along the apparatus.

As shown in FIG. 4 roller 72 is a driver roller and roller 74 is the driven roller. Roller 72 is mounted on a drive shaft 76 which is coupled to a tubing feed motor 77 (shown in FIG. 14) through a standard clutch 78 to drive the shaft when the clutch is engaged. A brake 80 is used to brake or stop the rotation of the shaft when the clutch is disengaged. A gear 82 mounted on shaft 76 is coupled to a gear 84 which drives a driven shaft 86 supporting the roller 74. The shafts 76 and 86 are supported on a frame 88 through a plurality of bearings 90.

The tubing 36, as shown in FIG. 4, is between the rollers 72 and 74. Roller 72 is wider than tubing 36 and made of rubber to provide a good grip over the entire area of the tubing. Roller 74, however, which may be made of aluminum, is narrower than the tubing 36. The reason for these particular roller widths is to prevent them from re-creasing the creases 38 and 40, so that the tubing may be eventually opened to the desired shape.

As the tubing 36 is fed from the drive rollers 72, 74, it is sent to a cutting and shaping station shown generally at 92 in both FIGS. 1 and 5 to which reference now will be made. The cutting mechanism includes a cutting knife 94 having a fixed blade 94a and a movable blade 94b which is coupled to a cylinder rod 96 that is actuated by a pneumatic cylinder 98. One end of rod 96 supports a magnet 100 which closes reed switches RS2 and RS4 connected, respectively, to the upper and lower ends of cylinder 98. A predetermined length of tubing 36 is fed into the shaping and cutting station 92, after which the movable blade 94b descends to cut the tubing.

Prior to the cut, a tube holding and shaping mechanism 102 is moved to an upper position into the station 92 to hold and shape the tubing 36 as the cutting operation occurs. The mechanism 102 holds externally and shapes the tubing 36 of the predetermined length which is to be cut from the continuous supply. As may be seen in FIG. 5, mechanism 102 is in a lowered position having a cut tubing 36, from a previous cutting operation, which has been formed to a desired shape. The cut tubing 36 held in mechanism 102 may be compared to the uncut tubing 36 at station 92, which is only slightly opened, i.e., such tubing is still relatively flat.

In the embodiment shown in FIGS. 1 and 5, when the mechanism 102 is stationary in the lowered position away from the cutting and shaping station 92, the cut tubing 36 is moved or slid around an object 103, such as a penlight battery or cell, to cover the cell. A pneumatic cylinder 104, supported on a frame 106, has a cylinder rod 108 which is extendable from the cylinder. The rod 108 has at one end a rigid pusher 110 which pushes the cut tubing 36 from one end, and has at another end a magnet 112 which closes reed switches RS5, RS6 and RS7 in sequence as the cut tubing 36 is being pushed to slide along and out of mechanism 102 onto the cell 103.

With reference to FIG. 1, the holding and shaping mechanism 102 is moved between its upper position in cutting and shaping station 92 and its lowered position by a transporter 113 including a pneumatic cylinder 114 and cylinder rod 116 which supports at its upper end the mechanism 102. A magnet 118 is connected to the lower end of rod 116 and closes reed switches RS1 and RS3 at the lower and upper ends, respectively, of cylinder 114 as the rod is raised.

As shown in FIGS. 1 and 5, a star wheel 120, which is illustrated in more detail in FIGS. 6 and 7 to which reference also should be made, has a plurality of grooves 122 about its periphery and is rotatable in a clockwise direction as seen in FIG. 6 to bring individual cells 103 into alignment with the shaped tubing 36 held by mechanism 102 in the lowered position. A base plate 124 is connected to the rear of star wheel 120 and has a plurality of pins 126, each aligned with one groove 122. Each pin 126 is spring loaded by a spring 128 and slidable within a hole 130 in the base plate 124 to contact one end of cell 103. A cam 132 is fixed to a frame 134 at a position corresponding to the position in which the cell 103 comes into alignment with the cut tubing 36.

As the star wheel 120 is rotated, the rear of the pin 126 first contacts cam surface 132a and then moves along this surface to the cam surface 132b. During this movement, the spring 128 is compressed and the pin moves toward cell 103 to push the latter, at one end, partially outward towards cut tubing 36 and away from base plate 124. Thus, the cut tubing 36, when moved over cell 103, can extend beyond such one end of the tubing. Consequently, when the cell 103 is ultimately conveyed to a heat shrink tunnel, the tubing can be heat shrunk at least partially about such one end. The pin 126 also acts as a support to maintain the cell 103 stationary as the cut tubing is slid over it. While cam 132 is shown as being fixed, it may be made adjustable to be positioned closer to or further away from the base plate 124 to provide a greater or lesser movement of the cell 103 out of its groove 122.

The star wheel 120 is indexed or rotated periodically by a drive system 138 shown in FIG. 1 to bring a new cell 103 into alignment with new cut tubing 36. This system 138 includes a motor 140 whose output shaft 142 is connected through gears 144, including an idler gear 144a, to a clutch 146 having an input shaft 146a and output shaft 146b. A driver 148 is connected to shaft 146b to rotate therewith and drives a driven member 150 which is a Geneva mechanism. The Geneva mechanism 150 includes an 8-part or slotted driven wheel 150a which corresponds to the 8 grooves 122 in star wheel 120, and an output shaft 150b which is driven by the wheel 150a. An indexing output flange 150c is connected to the shaft 150b and to the star wheel 120 to index the latter one position, i.e., one-eighth one revolution of the wheel, each time the driver 148 engages one of the 8 slots of the wheel 150a. Flanges 150c are engaged in the slots 152 of the star wheel 120 shown in FIG. 6. The Geneva mechanism 150 is supported on a frame 154, as shown in FIG. 1. The structure and manner of operation of Geneva mechanisms are well known in the art and are disclosed, for example, in Mechanisms and Dynamics of Machinery, by Mabie and Owirk, John Wiley & Sons, Inc., 1957, Chapter 2.

As also shown in FIGS. 1 and 6, star wheel 120 receives the cells 103 from a supply chute 151 defined by two upper plates 151a, 151b and a lower third plate 151c connected to the latter plate. When a star wheel groove 122 is in the position A referenced in FIG. 6, the cell 103 therein is aligned with the cut tubing 36 held by mechanism 102 while in the lowered position to receive such tubing. When the star wheel 120 is indexed one position to move this groove into position B shown in FIG. 6, the cell 103 with the cut tubing 36 around it falls out of this groove onto a conveyor (not shown) which conveys it to a heat shrink tunnel (not shown), well known in the art, to heat shrink the tubing onto the cell 103.

FIGS. 8 and 9 illustrate in more detail the holding and shaping mechanism 102 and the transporter 113 for moving the former between the upper position into station 92 and the lowered position to transfer cut tubing onto the cell 103. The transporter 113 is supported on movable table 14 by a frame 156. The cylinder rod 116 has a pusher 158 near its forward end and is movable through a guide plate 160 which is supported within the frame 156 by two brackets 162. Pusher 158 is connected to a movable plate 164 through which the rod 116 extends and which supports two spaced apart rods 166 which slide through bores 168 of another guide plate 170 connected to table 14.

The holding and shaping mechanism 102 is supported on the upper ends of rods 166 and includes a plate 172 through which rods 166 extend, and a base support 174. The mechanism 102 also includes two fingers 176 and 178 which are pivotally connected between the support 174 and plate 172, via respective arms 180 and 182, by respective pivots 181 and 183. Each arm 180,182 has a respective lever 184 and 186 connected thereto by a respective pin 188 and 190 at one end of the levers. The other end of levers 184 and 186 have, respectively, pins 192 and 194 which connect these levers to a pneumatic cylinder, as will be described in relation to FIG. 11, for opening and closing the fingers 176,178. Additional levers 196 and 198 are pivotally connected, respectively, to pins 188 and 190 and in common to a pin 200 slidable within a slot 202 in the support 174.

Each of the fingers 176,178 has removably connected thereto a respective insert 204 and 206. These inserts 204,206 have longitudinally extending slots 208 and 210, respectively, in which the creases 38 and 40 of the tubing 36 are held, both in the raised and lowered positions of the mechanism 102. The inserts 204 and 206 are removably connected to the fingers 176 and 178 so that different shapes of tubing can be formed therein. For example, the internal surfaces 204a and 206a of the inserts shown in FIG. 8 form substantially a circle, thereby shaping the cut tubing 36 into substantially a circular configuration when the fingers 176 and 178 are closed. Other inserts having internal surfaces 204a and 206a which are, for example, elliptical or generally square, can be connected to the fingers 176 and 178 so that the cut tubing 36 can take corresponding shapes when the fingers are closed.

As shown in FIG. 5 and as indicated in FIG. 10, at the shaping and cutting station 92 there is a pin 212 fixed to a suitable frame 213 to prevent the fingers 176 and 178 from fully closing. When the mechanism 102 is raised to the upper position, the fingers 176,178 close around the flat tubing 36 of predetermined length which is to be cut. Surfaces 176a and 178a of fingers 176,178 come to rest on the pin 212, thereby preventing the fingers from fully closing. At this time, which is prior to the cutting operation, the tubing 36 to be cut is still substantially flat, with the creases 38 and 40 being held in slots 208 and 210. In this condition, the tubing 36 is cut and then the mechanism 102 lowered with the cut tubing. As this lowering occurs, inclined surfaces 176b and 178b of the fingers contact the pin 212 so that the fingers gradually fully close. During this finger closing action, the creases 38 and 40 are moved slightly towards each other, so that when there is full closure of the fingers, the cut tubing 36 pops open and is formed into a shape defined by the inner surfaces 204a,206a of the inserts.

As shown in FIG. 11, the apparatus for opening and closing the fingers 176 and 178 includes a pneumatic cylinder 214 having a push rod 216 which pushes on a member 218 to which pin 194 is connected. The other end of cylinder 214 is connected to the pin 192. When air is introduced into the pneumatic cylinder 214 to extend rod 216, the fingers 176 and 178 are pivoted open. Due to the common connection at pin 200, only one finger 178 needs to be pushed by the rod 216 since this will move pin 200 upwards in slot 202, as shown in FIG. 10, thereby causing finger 176 also to open. Furthermore, the fingers 176,178 will open the same distance from a centerline extending through the fully closed fingers. Cylinder 214 and rod 216 are not shown in FIGS. 8 and 10 so that the other elements of mechanism 102 may be described more easily.

In the embodiment shown in FIG. 1, the mechanism 102 is disclosed as being movable only in a vertical direction up and down to hold externally, via creases 38,40, and shape the cut tubing 36. This mechanism 102 is used, together with the star wheel 120, in order to supply cut tubing entirely around relatively small objects such as cells 103 by pushing the tubing onto the cells. However, the principles of the present invention can be used to apply cut tubing to limited areas of much larger objects such as wine bottles having a circular shape or a relative large package comprising two circular cylindrical members (e.g. salt and pepper shakers) which together form an elliptical shaped object. For these larger objects the fingers 176 and 178 having the shaped cut tubing 36 can be movable themselves over the larger objects to place the tubing around, for example, the middle area of these objects.

The structure for placing the fingers 176,178 and hence the cut tubing around limited areas of larger objects is shown in FIG. 12. Here, the mechanism 102 is supported on rods 214 and 216 which extend through bearings 215 and 217, respectively, on a plate 218. A pneumatic cylinder 220 is connected to plate 218 and has a cylinder rod 222 which moves vertically a cross member 223 connected to rods 214,216.

Plate 218 also supports two guide blocks 224 and 226 through which guide rails 228 and 230 extend, respectively. A hydraulic cylinder 232 has a cylinder rod 234 connected to plate 218 to move the latter back and forth on guide rails 228 and 230.

With the structure of FIG. 12, the mechanism 102 can be moved upwardly from an initial position into station 92, as in the embodiment of FIG. 1. This is accomplished by operating cylinder 220 to retract rod 222, thereby raising cross member 223 and moving rods 214 and 216 through plate 218. After cutting, the cut tubing held by the mechanism 102 is lowered to an aligned position with a larger object by extending rod 222. Cylinder 232 is then operated to extend rod 234 a predetermined distance to slide plate 218 along rails 228 and 230, thereby moving mechanism 102 holding the cut and shaped tubing around a desired area of the object. The fingers 176 and 178 can then be opened and the rod 234 retracted to move mechanism 102 away from the object, leaving the cut tubing around the object.

In still another embodiment, the mechanism 102 need not be moved vertically, but need only be moved horizontally. The mechanism 102 can be held at the level of the tubing 36 in the station 92 and moved back and forth horizontally between that station and to an aligned object around which the cut tubing can be placed. It is to be noted that in these alternative embodiments where relatively larger objects are to be labeled, systems other than star wheel 120 can be used to index these objects and align them properly with the cut tubing. These systems are well known in the art and include, as one example, what is known as "timing screws".

There will now be described one cycle of operation of the embodiment of FIG. 1.

FIG. 13 is a timing diagram showing the timing for the operation of the cylinders 104,214,114 and 98, the material feed, and the indexing of the star wheel 120. The timing diagram illustrates one sleeve cycle from time $t_0$ to $t_{8+}$, this cycle being, for example, about 0.84 seconds. At time $t_0$, the cylinder 104 push rod 108 is fully retracted, the cylinder 214 push rod 216 has the fingers 176,178 closed, the cylinder 114 slide rod 116 is fully retracted so that the mechanism 102 is in the lowered position shown in FIGS. 1 or 5, the cylinder 98 push rod 96 is fully retracted so that the blade 94b is in its up position, the tubing 36 is being fed through the apparatus into station 92, and the star wheel 120 is stopped. The operation of the invention will be described assuming that at time $t_0$ a cell 103 is in the star wheel 120 ready to receive a shaped cut tubing 36 which is being held in the inserts 204,206.

At time $t_1$, rod 108 starts extending from cylinder 104 towards the cut tubing 36 being held in inserts 204,206. Between time $t_1$ and $t_2$, pusher 110 on rod 108 comes into contact with one end of the cut tubing 36. Upon being pushed by rod 108, the cut tubing 36 slides out of inserts 204,206 and around cell 103 since the creases 38,40 are able to slide along slots 208,210.

At time $t_2$, the rod 216 begins to extend to open the fingers 176,178 since the pusher 110 is nearing these fingers. At time $t_3$, the fingers 176,178 are fully opened and the rod 108 continues to extend with the pusher 110 moving between the opened fingers to continue pushing the cut tubing 36 onto cell 103. Before the fingers 176,178 have been fully opened, the cut tubing 36 will have been pushed substantially around cell 103 so that positive external control of the tubing is maintained for most of the movement of the tubing.

At time $t_4$, rod 108 is fully extended and the feeding of the continuous supply of tubing 36 may cease (but could continue until time $t_{7+}$ when the tubing must be cut). Thus, at station 92 there will be tubing of a predetermined length ready to be cut. This movement of the star wheel 120 transfers the cell 103 which just received the cut tubing 36 onto the above-mentioned conveyor (not shown) for conveyance to the heat shrink tunnel, and brings a new cell 103 into position to receive a cut tubing.

At time $t_{5+}$, rod 108 is fully retracted and rod 116 begins to extend from cylinder 114, thereby raising mechanism 102 into the station 92. At time $t_{6+}$, rod 116 is fully extended and rod 216 begins to retract into cylinder 214 to close fingers 176,178 around tubing 36 in station 92. At about time $t_7$, rod 216 is fully retracted with fingers 176,178 not quite fully closed in view of pin 212. Thus, at this time, the tubing 36 of predetermined length is being held by its creases 38,40 in slots 208,210.

At time $t_{7+}$, rod 96 begins to extend from cylinder 98 and just before time $t_8$ blade 94b cuts the tubing 36. Then, at time $t_8$, rod 116 begins to retract into cylinder 114 to lower mechanism 102 with the cut and shaped tubing 36. At time $t_{8+}$, rod 96 commences retracting into cylinder 98 to raise blade 94b. Finally, at about time $t_{8.5}$ the cycle is complete and a new cycle is ready to commence.

The circuit of FIG. 14 for carrying out the timing of FIG. 13 will now be described. This circuit is powered from a 115 VAC source which is transformed by a transformer T to 24 VDC. The circuit includes a number of push buttons (PB) which may be located on a control panel (not shown). PB1 is used to turn on the 24 VDC supply power to the equipment. PB2, of which there are two which are ganged, is used to index the star wheel 120 one position prior to putting the apparatus in a "run" mode so that a cell 103 is properly positioned at time $t_0$. PB3, of which there are three all ganged together, places the apparatus in the "run" condition to commence the cycle shown in FIG. 13. PB4 is a power off switch which, when depressed, will open the 24 VDC power supply to the equipment. PB5 is depressed to cease the "run" cycle. PB6 (not shown) is a selector switch on the machine operator's control panel, which, when it is in a "count" position as will be more fully described, maintains open normally open push button contacts PB6-1, PB6-2, and PB6-3, while maintaining closed normally closed push button contacts PB6-4 and PB6-5. When selector switch PB6 is in the "scan" position (to be described) contacts PB6-1, PB6-2 and PB6-3 are closed, while contacts PB6-4 and PB6-5 are open. When the selector switch PB6 is in the "count" position, only a shaft encoder-decoder to be described determines the length of tubing to be cut by controlling the drive rollers 72,74, while when the selector switch is in the "scan" position, the photoscanner 58 is operative to determine such tubing length. PB7 can be depressed to commence the feeding of the tubing 36.

Relay R1 is energized when PB1 is closed to supply power to the equipment. This relay R1 controls normally open (NO) contacts R1-1 to activate the index motor 140, closes NO contacts R1-2 to energize the tubing feed motor 77, closes NO contact R1-3 to supply power to other parts of the circuit, and closes NO contacts R1-4 to maintain the relay R1 energized when PB1 is open. Relays R2 and R3 are energized when PB3 is depressed to commence one sleeve cycle without indexing the star wheel 120. Relay R2, when energized, closes NO contacts R2-1 and R2-2 to maintain, respectively, relays R2 and R3 energized when PB3 is opened. Relay R2 also closes NO contacts R2-3 to energize a relay R5. Relay R3, when energized, opens normally closed (NC) contacts R3-1 to deenergize a relay R11, closes NO contacts R3-2 to maintain itself latched, and closes NO contacts R3-3 to energize a solenoid valve SV2A.

A relay R4, when energized, closes NO contacts R4-1 to activate the star wheel 120 and index it one position. A relay R5 is energized to control the feed of tubing 36 by closing, when energized, NO contacts R5-1 coupled to a power supply 236 shown at the top of FIG. 14. This allows clutch 78 to engage shaft 76, thus coupling this shaft to feed motor 77. Relay R5 also closes contacts R5-2 to activate a shaft encoder-decoder 238 which then senses rotation of shaft 76. A relay R6 is energized also to control the tubing feed by opening, when energized, NC contacts R6-1 coupled to power supply 236 to release the brake 80. Relays R5 and R6 comprise a well known single latching relay which will be more fully described.

A relay R7 is energized to reset all of the solenoid valves SV controlling the supply of air pressure to the various cylinders, as will be described, and lock these valves in their start position. In this manner, upon initial start up of the machine the cylinders will be at the start position represented at time $t_0$. Relay R7, when energized, closes NO contacts R7-1 to energize a solenoid valve coil SV2B and closes NO contacts R7-2 to energize a solenoid valve coil SV5B. A relay R8, when energized, opens NC contacts R8-1 to deenergize relay R3 and close NO contacts R8-2 to energize solenoid valve coil SV2B.

A relay R9 controls the movement of the several cylinders, as will be described, by closing, when energized, NO contacts R9-1 to energize a time delay relay TDR2 and closing NO contacts R9-2 to energize solenoid valve coils SV4A and SV3B, as well as time delay relay TDR1. A relay R10 is energized when the apparatus is set to run, as indicated by a pressure switch PS which supplies power to the relay R10 when adequate air pressure is built up in the system. Relay R10, when energized, closes NO contacts R10-1 to energize relay R11. The relay R11 is energized when PB2 is closed to index the star wheel one position. Relay R11, when energized, controls a mechanism (not shown) to release the clutch 78 and enable the star wheel 120 to be indexed one position by Geneva mechanism 150.

The circuit includes, as already indicated, a number of time delay relays (TDR) which delay operation of various of the cylinders. Such time delay relays function to change the state of the contacts which they control after they have been energized and subsequently timed out. Relay TDR1, after it is energized and timed out, closes NO contacts TDR1-1 to energize a solenoid valve coil SV5A. Relay TDR2 closes NO contacts TDR2-1 to energize solenoid valve coil SV2A. A relay TDR3 opens NC contacts TDR3-1 to deenergize relay R5 and closes NO contacts TDR3-2 to energize relay R6. A relay TDR4 closes NO contacts TDR4-1 to activate the encoder-decoder 238 and control switching of contacts TDR4-2 for reasons which will be described below. A relay TDR5 closes NO contacts TDR5-1 to energize relay TDR4 and closes NO contacts TDR5-2 to energize solenoid valve coil SV1.

A solid state SSR1, when energized, closes NO contacts SSR1-1 to enable energization of relays TDR3, R5 and solenoid valve coil SV2A. A solid state relay SSR2, when energized, closes NO contacts SSR2-1 to enable energization of solenoid valve coils SV4B and SV5B.

The circuit of FIG. 14 also shows a number of reed switches RS. These switches are physically located on the various cylinders as shown in FIGS. 1 and 5. The magnet 112 on the rod 108 controls switches RS5, RS6 and RS7. The magnet 118 on the rod 116 controls switches RS1 and RS3, while the magnet 100 on the rod 98 controls switches RS2 and RS4.

A latch switch LS1 is closed by a cell 103 as such cell is being moved from a position C shown in FIG. 6 to the position A shown in this Figure, thereby enabling energization of relay $R_3$. If no cell is in the position C, star wheel 120 can be indexed until a cell is in such position C ready to close LS1 and receive cut tubing in position A. A latch switch LS2, used to energize relay $R_4$, is closed as a position check on the star wheel 120 to make sure that a groove 122 is in the position A before cut tubing is placed over a cell 103. This closing of latch switch LS2 is accomplished by cams 238 (see FIG. 7) on back plate 124 aligned radially with grooves 122 and which close the switches LS2. A latch switch LS3 is closed when the fingers 176,178 are opened, thereby energizing solenoid valve coil SV4A. A latch switch LS4 is a safety switch and is closed or opened by the operator of the machine to energize or deenergize relay R1. A latch switch LS5 is closed manually by the machine operator when the supply chute 151 for the cells is full. While the physical position of these latch switches LS is not shown, one skilled in the art could so locate them based on the above description.

The various solenoid valves SV shown in FIG. 14 control the flow of air to and from the pneumatic cylinders to reciprocate their cylinder rods. Valve SV1 is the main air valve having one energizing coil and, when this coil is energized, an air supply is introduced into the system. The other valves SV each comprise a single valve having two energizing coils corresponding, respectively, to two porting or flowing conditions. These conditions are referenced as A and B so that, for example, valve SV2 has two coils SV2A and SV2B. The two coils SV2A and SV2B, when energized, introduce air into cylinder 104 to extend and retract, respectively, the cylinder rod 108. Two coils SV3A and SV3B of solenoid SV3 control the cylinder rod 216 of the cylinder 214 to open and close, respectively, the fingers 176,178. Two coils SV4A and SV4B of solenoid SV4, when energized, introduce air into the cylinder 114 to extend and retract, respectively, the cylinder rod 116. Two coils SV5A and SV5B of solenoid SV5 control the cylinder 98 to extend and retract, respectively, the cylinder rod 96.

Other elements shown in FIG. 14 include NC contacts C1, C2 and C3 which are additional safety contacts that are automatically opened to deenergize relay R1 when an unsafe condition exists. For example, C1 may open when there is an overload, C2 when the conveyor (not shown) carrying the cells to the heat shrink tunnel is not on, and C3 when the star wheel 120 is jammed. Also disclosed is a red light L1 which is turned on when PB1 is closed to supply power to relay R1, and a green light L2 which is turned on to indicate that the machine is in the "run" condition. Fuses F1 and F2 function in a standard manner to disconnect the power supply if there is an overload.

The operation of the circuit of FIG. 14 will now be described. The push button PB1 is first depressed. This causes a supply of power, 24 VDC, from transformer T to energize relay R1. It is assumed push button PB4 is in its normally closed state, that contacts C1, C2 and C3 are closed, and that safety switch LS4 is closed. Light L1 will be energized to indicate that the power is being supplied to the equipment. Contacts R1-1 and R1-2 therefore will be closed to turn on the index motor 140 and feed motor 77, respectively, with the 115 VAC power supply. Contact R1-4 is closed to maintain relay R1 energized after the button PB1 is released. Relay TDR5 also is energized and after its time delay, closes contacts TDR5-1 to energize relay TDR4 via the 115 VAC supply and to close contacts TDR5-2 to energize solenoid valve SV1. With the energization of the latter valve, the main air supply is supplied to the system.

The pressure switch PS is initially in the position shown in FIG. 14, so that relay R7 and not relay R10 is initially energized upon closure of PB1; therefore, contacts R7-1 will close to open coil SV2B to enable the air supply place the push rod 108 in its retracted position, and to close contacts R7-2 to energize coil SV5B to place the cutting blade 94b in its upward position. The closure of contacts R7-2 also energizes coil SV4B so that the rod 116 in the cylinder 114 is returned to the retracted position. With the rod 96 for the knife cylinder 98 in its retracted position, switch RS2 will be closed so that coil SV3B is energized to maintain the fingers 176,178 closed. Therefore, upon initial closing of PB1, relay R7 holds the air valve circuit in a "reset" or start position to ensure that all the air cylinders are in their proper position at start up, this position corresponding to time $t_0$. It is to be noted, however, that at the time of this initial start-up with the various cylinders in position at time $t_0$, the mechanism 102 will not yet be holding any cut tubing 36 and a cell 103 will not be aligned with the mechanism 102.

When sufficient air pressure in the supply circuit has been built up, the pressure switch PS will switch to energize relay R10 and deenergize relay R7, thereby releasing the air cylinders from their reset position.

Prior to a starting a "run", it will be necessary to index the star wheel 120 so that a cell 103 will be in position to receive cut tubing when it is in the mechanism 102. Therefore, when the 115 VAC main power supply is turned on, push button PB2 can be depressed to energize relay R11 and index the star wheel 120 one position each time this button is depressed. This button PB2 can be depressed prior to depressing button PB1. In this manner, the initial cell 103 will be located in a groove 122 at position C (or A) such that on commencing a run this initial cell will receive cut tubing. Therefore, when PB3 is depressed to start a run, the apparatus will cycle through one time. This depressing of PB3 will cause the tubing to feed, stop and be cut, with the fingers of mechanism 102 being just above the cell 103. If the cell is in position C and switch LS5 is depressed (LS5 may be a foot switch), the star wheel will index and then the cycle will start, i.e., the cut tubing or sleeve will be pushed on the cell.

Assume now that PB1 and PB2 have been depressed, so that a "run" can now commence. Button PB3 is then depressed to energize relays R2 and R3. Also, with the rod 108 retracted, switch RS5 is closed to energize relay R9 which closes contacts R9-1 and energizes relay TDR2. Also, with the rod 116 retracted, switch RS1 is closed to energize SSR1 which immediately closes contacts SSR1-1. Consequently, after a time delay from $t_0$ to $t_1$, contacts TDR2-1 are closed, thereby energizing coil SV2A and causing the rod 108 to extend from the cylinder 104 and push the cut tubing. At time $t_{2+}$, the rod 108 is approximately half way extended so that switch RS6 is closed to energize coil SV3A. This introduces air pressure into the cylinder 214 to cause the fingers 176,178 to open and, thereby, enable the push rod 108 to continue extending between the open fingers and further push the cut tubing over the cell 103.

At time $t_4$, the rod 108 will reach its fully extended stroke so that switch RS7 is closed to energize relay R8. Contacts R8-2 will be closed to energize coil SV2B and thereby cause the rod 108 to return to its retracted position within the cylinder 104. Also, contacts R8-1 are opened to deenergize relay R3 which will then again be energized when a cell 103 closes switch LS1 for another cycle. With the deenergization of relay R3, contacts R3-1 return to their normally closed state so that relay R11 will be energized through closed button PB3 and, thereby, release clutch 78 for indexing the star wheel 120 one position.

When the rod 108 returns to its retracted position at time $t_{5+}$, switch RS5 is closed to energize R9 which in turn closes contacts R9-2 to energize coil SV4A (assuming switch LS3 is closed because the fingers 176,178 are opened). Accordingly, the rod 116 will be extended to raise the mechanism 102 and enable the fingers 176,178 to hold the tubing 36 during the cutting operation. When this rod 116 is completely extended, at time $t_{6+}$, switch RS3 is closed to energize coil SV3B, thereby closing the fingers 176,178 about the tubing. Also, relay TDR1 is energized and, after its time delay to $t_{7+}$, contacts TDR1-1 will be closed to energize coil SV5A. Accordingly, with the fingers 176,178 closed on tubing, the rod 96 then will be extended to enable the knife 94 to cut this tubing. Then, when the rod 96 is fully extended, switch RS4 is closed to energize relay SSR2 which closes contacts SSR2-1 to energize coils SV4B and SV5B. Accordingly, the rod 116 is retracted to lower mechanism 102 and the rod 96 is retracted to raise the blade 94b. When the rod 116 is fully retracted, relay TDR2 will have been energized by the energization of relay R9 and relay TDR4 will be activated. When relay TDR2 times out, coil SV2A will be energized, assuming a cell 103 is in position for receiving the tubing, so that the relay R3 will be energized to close contacts R3-3. This brings the machine full cycle and enables the commencement of a new cycle at time $t_0$.

There will now be described the tubing feed control during the cycle from $t_0$ to $t_{8+}$. As mentioned above, there are two embodiments for the control of the tubing feed, depending on whether the material is plain or has normal label markings on it. If the tubing 36 is plain, then the photoscan technique cannot be used, but only the count control provided by shaft encoder-decoder 238 will be operative to determine the predetermined length of tubing. In this embodiment, push button PB6 (not shown) is placed in the count position so that contacts PB6-1 through PB6-5 are in their normally open or closed state as shown in FIG. 14. At time $t_0$, relay SSR1 is energized so that contacts SSR1-1 are closed, thereby energizing relay TDR3.

Accordingly, until relay TDR3 times out, relay R5 will be immediately energized and override coil R6. Consequently, R5 first opens contacts R6-1 to release brake 80, and then closes contacts R5-1 to engage the clutch 78, thereby coupling feed motor 77 to shaft 76 to feed tubing 36 into station 92. Also, since relay TDR4 will be energized, contacts TDR4-1 will be closed, and since relay R5 closes contacts R5-2, encoder-decoder 238 will be activated to commence sensing of rotation of shaft 76. When encoder-decoder 238 is activated, it switches contacts TDR4-2 from the state shown in FIG. 14 to deenergize relay R6.

When encoder-decoder 238 has sensed a predetermined amount of rotation of shaft 76, which corresponds to feeding a certain amount of tubing into station 92, encoder-decoder 238 senses this and returns contacts TDR4-2 to the position shown in FIG. 14. At this time, relay R6 becomes energized to close contacts R6-1, thereby applying the brake 80 to stop feeding the tubing 36. Relay R5 will have become deenergized at the time R6 becomes energized since relay TDR3 will have timed out. Shaft encoder-decoders such as 238 are well known in the art and comprise an encoder that produces square wave output pulses as the shaft 76 rotates and a counter to decode the pulses and produce a signal to switch contacts TDR4-2 into the state shown in FIG. 14 after a predetermined count.

In the "scan" mode, selector switch PB6 is moved by the machine operator to the "scan" position, thereby changing the state of contacts PB6-1 to PB6-5 shown in FIG. 14. Thus, with PB6-1 closed, photoscanner 58 is activated through the 115 VAC supply to emit light onto tubing 36. Then, when relay R5 is energized, brake 80 is released, clutch 78 is engaged and contacts TDR4-2 switches state from that shown in FIG. 14, as described in the "count" mode. While encoder-decoder 238 is counting pulses, it inhibits photoscanner 58 from performing its sensing function, though it is emitting light. This inhibiting function is indicated in FIG. 14 by maintaining contacts I open. After encoder-decoder 238 counts a predetermined count, it switches contacts TDR4-2 to the state shown and removes the inhibit by closing contacts I, thereby creating a closed circuit through TDR4-2, closed contacts PB6-3 and closed contacts I. Now, when photoscanner 58 senses printed matter on tubing 36, the scanner closes its contacts A to energize relay R6 through PB6-2, A and TDR3-2. Accordingly, brake 80 is engaged to stop rotation of shaft 76.

The reason for this operation of the "scan" mode will now be described. As shown in FIG. 2, as the tubing 36 is being fed into the station 92, photoscanner 58 will be emitting light on one label 42, which will impinge on both the forward and rearward edges 44a and 44b, respectively, of the printed matter. However, for purposes of proper tubing registration with the cutting knife 94, the tube feeding should not stop until the photoscanner 58 senses forward edge 44a of the next succeeding label 42. Consequently, until the light from photoscanner 58 moves off of printed matter 44 of the label 42, its sensing function is inhibited by encoder-decoder 238. Then, when light impinges on the area between the rearward edge 44b of the one label and the forward edge 44a of the next succeeding label, encoder-decoder 238 removes the inhibit. Consequently, when the tubing 36 moves such that the light impinges on the edge 44a of such next label, there will be a change in reflectivity due to the change in color from background area 43 to printed matter 44. Photoscanner 58 now senses this change to energize relay R6 and apply brake 80.

It will be appreciated that the length of tubing 36 to be cut is determined by the count in the encoder-decoder 238. For example, if longer tubing needs to be cut, the counter in the encoder-decoder 238 can be set to a higher count before it will cause contacts TDR4-2 to return to the state shown in FIG. 14. When a longer or shorter tubing 36 is to be cut, hand wheel 20 can be rotated to slide table 14 in relation to table 16 and thereby provide proper space at station 92 for the tubing.

While a pneumatic flow diagram has not been shown for operating the various cylinders described above, this would be apparent to those skilled in the art from the description of the invention herein.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for placing tubing of predetermined length around an object, comprising:
   (a) means for supplying continuous tubing;
   (b) means for cutting the continuous tubing into tubing of a predetermined length;
   (c) means for holding externally a tubing of predetermined length; and
   (d) means for moving the cut tubing around the object, said holding means holding the tubing of predetermined length from the time the tubing is being cut to the time the cut tubing is moved around the object.

2. Apparatus according to claim 1 wherein said means for moving includes means for transporting said holding means over the object.

3. Apparatus according to claim 2 wherein said holding means includes means for shaping the cut tubing to conform substantially the cut tubing to the shape of the object.

4. Apparatus according to claim 3 wherein said transporting means comprises:
   (a) means for supporting said holding means; and
   (b) means for shifting said supporting means from one position in which said holding means is around the cut tubing while the tubing is being cut to another position in which said holding means is around the object.

5. Apparatus according to claim 4 wherein said means for shifting comprises:
   (a) first means for moving said supporting means from an initial position into said one position and from said one position into said initial position; and
   (b) second means for moving said supporting means from said initial position into said another position.

6. Apparatus according to claim 4 wherein said holding means comprises:
   (a) a base support;
   (b) a pair of arms pivotally mounted at one end on said base support;
   (c) a pair of fingers, each connected to the other end of one of said arms; and
   (d) a pair of inserts, each removably connected to one of said fingers, to grasp the tubing, said inserts having a predetermined shape to conform the cut tubing to the predetermined shape.

7. A machine according to claim 5 wherein said holding means comprises:
   (a) a base support;
   (b) a pair of arms pivotally mounted at one end on said base support;
   (c) a pair of fingers, each connected to the other end of one of said arms; and
   (d) a pair of inserts, each removably connected to one of said fingers, to grasp the tubing, said inserts having a predetermined shape to conform the cut tubing to the predetermined shape.

8. A machine according to claim 1 wherein said means for moving comprises:
   (a) means for positioning said holding means so that the cut tubing is aligned with the object, said holding means being spaced apart from the object; and
   (b) means for pushing the cut tubing around the object, said holding means including means enabling the cut tubing to slide in relation to said holding means.

9. A machine according to claim 8 wherein said pushing means includes a rigid surface which contacts an end of the cut tubing.

10. A machine according to claim 9 wherein said holding means includes means to release the cut tubing when the cut tubing is at a predetermined position around the object.

11. A machine according to claim 8 wherein said holding means comprises:
    (a) a base support;
    (b) a pair of arms pivotally mounted at one end on said base support;
    (c) a pair of fingers, each connected to the other end of one of said arms; and
    (d) a pair of inserts, each removably connected to one of said fingers, to grasp the tubing, said inserts having a predetermined shape to conform the tubing to the predetermined shape.

12. A banding machine for placing a tubular member around an object, comprising:
    (a) means for supplying continuous flat material having creases at either side of the material;
    (b) means for cutting off from the continuous material a predetermined length of material;

(c) means for holding the material of predetermined length at the creases during cutting and for shaping the cut material to form the tubular member; and (d) means for moving the cut tubular member around the object while said holding and shaping means is holding the cut tubular member.

13. A banding machine according to claim 12 wherein said holding and shaping means comprises first means for pushing the creases towards each other to open substantially the cut tubular member.

14. A banding machine according to claim 13 wherein said first pushing means comprises:

(a) a pair of fingers movable around the material of predetermined length; and (b) means, connected to said fingers, for grasping the material of predetermined length, said grasping means having slots for receiving the creases and a predetermined shape.

15. A banding machine according to claim 14 wherein said grasping means comprises a pair of inserts which are releasably connected to said fingers.

16. A banding machine according to claim 14 wherein said means for moving the cut tubular member comprises second means for pushing on one end of the cut tubular member to cause the creases to slide along said slots.

17. A banding machine according to claim 16 wherein said second pushing means comprises:

(a) a pneumatic cylinder; and (b) a cylinder rod having a rigid member at one end to push the cut tubular member.

18. A banding machine according to claim 14 wherein said means for supplying comprises:

(a) means for moving the continuous material;

(b) means, connected to said material moving means, for sensing when a certain amount of material has been supplied; and (c) means, responsive to said sensing means, for stopping the movement of the continuous material so as to register the predetermined length of material to be cut with said cutting means.

19. A banding machine according to claim 18 wherein said material moving means comprises:

(a) a roller to contact the continuous material;

(b) a rotatable shaft supporting said roller; and (c) means for rotating said shaft.

20. A banding machine according to claim 19 wherein said sensing means comprises a shaft encoder-decoder for producing an output signal when said shaft has rotated a predetermined amount, said stopping means being responsive to said output signal.

21. A banding machine according to claim 19 wherein said sensing means comprises:

(a) a shaft encoder-decoder for producing a first output signal when said shaft has rotated a predetermined amount; and (b) means, responsive to said first output signal, for photoscanning the continuous material, said scanning means generating a second output signal when a certain mark is detected on the continuous material, said stopping means being responsive to said second output signal.

22. A machine for applying tubular members around objects, comprising:

(a) first means for supplying flat, flexible, continuous material having sharp creases on either side of the material;

(b) means for reducing the creases so that the continuous material is opened slightly;

(c) means for cutting off from the supply a predetermined length of the material having the reduced creases;

(d) means for holding externally the material of predetermined length at the reduced creases during cutting and for shaping the cut material to form one of the tubular members;

(e) second means for supplying the objects; and (f) means for placing the one tubular member around an object, said holding and shaping means holding the one tubular member from the time the material is being cut to the time the one tubular member is at least substantially around the object.

23. A machine according to claim 22 wherein said holding and shaping means comprises means for pushing the reduced creases towards each other to open substantially the material.

24. A machine according to claim 23 wherein said means for pushing the reduced creases comprises:

(a) a base support;

(b) a pair of arms pivotally mounted at one end to said support;

(c) a pair of openable and closable fingers, connected to the other end of said arms, for surrounding the material of predetermined length; and (d) a pair of inserts connected to the inside of said fingers and having slots for receiving the reduced creases when said arms pivot to close said fingers, said inserts having a predetermined shape.

25. A machine according to claim 24 wherein said means for placing comprises:

(a) a movable support for supporting said holding and shaping means;

(b) first pneumatic cylinder means for moving said movable support between a first position and a second position in which said holding and shaping means first holds the material during cutting; and (c) second pneumatic cylinder means for pushing the cut tubular member when said movable support is in said first position, said second pneumatic cylinder means pushing one end of the tubular member along said slots to slide the member around the object.

26. A machine according to claim 25 wherein said cutting means comprises a knife having a blade which cuts through substantially flat surfaces of the continuous material having the reduced creases.

27. A machine according to claim 26 wherein said first means for supplying comprises:

(a) means for moving the continuous material, including two pair of rotatable shafts and drive rollers mounted on said shafts, respectively, each pair including a shaft and a drive roller for mounting on opposite surfaces of the continuous material, respectively;

(b) a shaft encoder-decoder, coupled to one of said shafts, for producing a first output signal when said one shaft has rotated a predetermined amount;

(c) means, responsive to said first output signal, for optically scanning the continuous material, said scanning means generating a second output signal when a certain mark is detected on the continuous material; and (d) means, responsive to said second output signal, for stopping said drive rollers to enable the continuous material to be cut.

28. A machine according to claim 27 wherein said first means for supplying further comprises a supply reel for storing the continuous material.

29. A machine according to claim 28 wherein said drive rollers are elongated in a direction transverse the continuous material, one of said rollers being wider than the other of said rollers to prevent recreasing of the creases.

30. A machine according to claim 29 wherein said means for reducing the creases is positioned between said drive rollers and said supply reel in the direction of travel of the continuous material.

31. A machine according to claim 30 further comprising a first fixed pin near said cutting means, said fingers contacting said first pin to prevent full closure of said fingers when the continuous material is being cut.

32. A machine according to claim 31 wherein said base support includes a slot and a second pin slidable in said slot, said arms being connected in common to said second pin which slides in said slot when said arms pivot.

33. A machine according to claim 32 wherein said second means for supplying comprises:
(a) a star wheel having a plurality of grooves for receiving the objects;
(b) means for feeding the objects into the grooves; and
(c) means for rotating said star wheel to align an object with a cut tubular member.

34. A machine according to claim 33 wherein said second means for supplying further comprises means for forcing the objects partially out of said grooves towards the cut tubular members.

35. A machine according to claim 34 wherein said means for forcing comprises:
(a) a base plate carried on said star wheel;
(b) third spring loaded pins aligned with said grooves and connected to said base plate; and
(c) a cam having a cam surface which is followed by said spring loaded pins, said cam pushing a spring loaded pin when an object is aligned with a cut tubular member.

36. A machine according to claim 35 wherein said means for rotating said star wheel comprises:
(a) a motor;
(b) a Geneva mechanism for indexing said star wheel; and
(c) clutch means coupling said motor to said Geneva mechanism.

37. A machine according to claim 36 further comprising:
(a) a movable support table supporting said first supplying means, said reducing means, said cutting means, said holding and shaping means, and said placing means;
(b) a fixed support table for supporting said second supplying means; and
(c) means for moving said movable support table in relation to said fixed support table, whereby the length of the tubular member to be cut can be varied.

* * * * *